United States Patent [19]

Sheth et al.

[11] Patent Number: 5,055,338

[45] Date of Patent: Oct. 8, 1991

[54] METALLIZED BREATHABLE FILMS PREPARED FROM MELT EMBOSSED POLYOLEFIN/FILLER PRECURSOR FILMS

[75] Inventors: Paresh J. Sheth, Sugarland, Tex.; Francis M. Thompson, Whitehouse Station, N.J.

[73] Assignee: Exxon Chemical Patents Inc., Linden, N.J.

[21] Appl. No.: 251,716

[22] Filed: Sep. 29, 1988

Related U.S. Application Data

[63] Continuation-in-part of Ser. No. 24,503, Mar. 11, 1987, Pat. No. 4,777,073.

[51] Int. Cl.$^5$ ................................................. B32B 3/02
[52] U.S. Cl. ................................. 428/155; 428/159; 428/317.9; 428/403; 428/457; 428/461; 428/698; 428/910; 264/288.4; 264/288.8
[58] Field of Search ..................... 264/288.4, 288.8; 428/155, 159, 317.9, 910, 461, 457, 403, 698

[56] References Cited

U.S. PATENT DOCUMENTS

| | | |
|---|---|---|
| 4,076,698 | 2/1978 | Anderson et al. . |
| 4,116,892 | 9/1978 | Schwarz ........................... 264/288.8 |
| 4,205,021 | 5/1980 | Morita et al. . |
| 4,350,655 | 9/1982 | Hage ................................ 264/288.8 |
| 4,472,328 | 9/1984 | Sugimoto et al. ..................... 264/41 |
| 4,585,604 | 4/1986 | Okuyama et al. ................ 264/288.8 |
| 4,777,073 | 10/1988 | Sheth ................................... 428/155 |

FOREIGN PATENT DOCUMENTS 2115702  2/1983  United Kingdom .

*Primary Examiner*—Patrick J. Ryan
*Attorney, Agent, or Firm*—John F. Hunt; T. Dean Simmons

[57] ABSTRACT

A breathable metallized polyolefin film is prepared by: melt embossing a highly filled polyolefin film to impose a pattern of different film thickness therein; stretching the melt embossed film to impart greater permeability in the area of reduced thickness in comparison to the areas of greater thickness; and coating the resulting stretched embossed film with a suitable metal.

34 Claims, No Drawings

METALLIZED BREATHABLE FILMS PREPARED FROM MELT EMBOSSED POLYOLEFIN/FILLER PRECURSOR FILMS

CROSS-REFERENCE TO RELATED APPLICATION

This application is a continuation-in-part of U.S. Ser. No. 024,503 filed Mar. 11, 1987, now U.S. Pat. No. 4,777,073 issued Oct. 11, 1988. This application is also related to copending U.S. Ser. No. 101,118, now U.S. Pat. No. 4,929,303 issued May 29, 1990, which is a continuation-in-part of U.S. Ser. No. 024,503.

BACKGROUND

1. Field of the Invention

The invention relates to metallized breathable polymer films—polymer films which are gas/vapor permeable and liquid water impermeable—prepared from highly filled polyolefin film and coated with a suitable metal.

2. Related Art

It is known to prepare porous polyolefin films by stretching a precursor film filled with calcium carbonate. "Breathable" films which are gas/vapor permeable and liquid impermeable to aqueous fluids have been described in U.S. Pat. No. 4,472,328, assigned to Mitsubishi Chemical Industries, Ltd. The Mitsubishi patent describes a breathable polyolefin film prepared from a polyolefin/filer composition having from 20 percent to 80 percent by weigh of a filler such as a surface treated calcium carbonate. A liquid or waxy hydrocarbon polymer elastomer such as a hydroxy-terminated liquid polybutadiene was found to produce a precursor film that could be monoaxially or biaxially stretched to make a film breathable. The breathable film described by Mitsubishi is also described in Great Britain Patent No. 2,115,702, assigned to Kao Corporation. The Kao patent further describes a disposable diaper prepared with a breathable film as disclosed by the Mitsubishi patent. The breathable film is used as a backing for the diaper to contain liquid.

U.S. Pat. No. 4,350,655, assigned to Biax Fiber Film, describes a porous polyolefin film containing at least 50 percent by weight of a coated inorganic filler. The precursor film is formed without the addition of an elastomer by employing an inorganic filler surface coated with a fatty acid ester of only silicon or titanium. The precursor film is then rolled between horizontally grooved rollers. Cold stretching of the precursor film at a temperature below 70° C. produces a porous film. Some of the resulting films were stated to be both vapor and liquid permeable, however, at least one film was stated to be permeable to air.

Copending application Ser. No. 024,503 filed Mar. 11, 1987, teaches a breathable film and a process for making said breathable film. For the sake of clarity and continuity, much of the disclosure of this copending application is repeated under the heading "Detailed Description of Preferred Embodiments of the Invention." The instant invention applies a thin metallic coating to the breathable film taught in U.S. Ser. No. 024,503 and produces a metallized film having substantially the same breathable properties as the unmetallized film.

Metallized films possess many properties of great commercial interest. These properties include:

1) Reflection properties which allow the use of metallized films as reflectors to control energy, usually as insulators but also as distributors;

2) Electrical conductivity which helps control static electricity in packages either during packaging or in protecting what is packaged. Electrical conductivity is also important in capacitors and condensers where the property is primary;

3) Brilliance—a "grabber" property when the film is used as a packaging material. This provides a boost for point-of-sale items and is also a property that conveys the aura of quality;

4) Barrier properties—not only a variable ultraviolet and visible light controller but also, in some cases, a gas barrier;

5) The metallized layer is very light in weight because it is so thin—500 Angstroms is considered a fairly heavy coating;

6) The ultrathin coating tends to have better flex resistance than a foil providing the same properties; and 7) Relatively low production cost. If the cost were not attractive, the level of real business activity utilizing metallizing film would not exist.

To obtain the best set of these metallized properties, a judicious choice of film substrate must be made. Oriented polyester films are the most widely used, and at least ten substrates are now being commercially metallized: polyethylene (PE), cast polypropylene (PP), oriented polypropylene (OPP), polyethylene terephthalate (PET), polycarbonate, rigid polyvinyl chloride (PVC), polystyrene, polyimide, polyamide, paper and cellophane. This is not an exhaustive list but rather is intended to show the variety of substrates being metallized.

Oriented polypropylene is being used in capacitors, condensers and transformers. Polyester is being used in roll leaf, stamping foils, condensors, wall coverings, solar control and packaging. Polycarbonate is used in some graphic applications. PVC (only rigid can be used due to plasticizer evaporation during metallizing) is used in flame proof Christmas tinsel and holiday garlands. Polycarbonate, PVC and polystyrene are used in heavy gauges to make thermoformed trays. Polyimide in outer space applications—usually metallized with pure gold. Nylon is finding some limited applications, paper is used in labels and cellophane in wrappers.

Polyethylene and cast polypropylene are two films very familiar to the converting industry but not to the metallizing industry. Relative to polyester and OPP, polyethylene is heat sensitive, extensible and soft so that it must be handled with care. This difference is familiar to the converting industry where polyethylene is routinely printed at high speeds. Although polyethylene is not familiar to the metallized industry, it is being used as a metallized substrate by several metallizers on a commercial basis.

Metalized polyethylene is bright; it provides a rich lustrous metallic finish similar to the brightest of foils, although not as bright as the finish obtained with metallized polyester.

Polyethylene is much softer than the oriented films commonly used. This softness contributes to greater flexibility, and in textile substitute applications, less crinkle noise and a more pleasing hand. Polyethylene is heat sealable and thus can be formed into bags or pouches or it can be laminated to another substrate that has been reverse printed. The combination of brilliant protected graphics and heat sealability can therefore be combined in a single web. Metallized polyethylene is vacuum formable, and when laminated to nylon can constitute the formable web of a meat package.

The low infrared absorption characteristics of polyethylene make it an excellent reflector substrate. Body heat emitted as infra-red (IR) radiation is reflected and returned by a metallized PE film instead of being absorbed where it can be conducted or convected away. This is particularly true of IR radiation in the frequencies associated with normal body temperature.

Embossed polyethylene makes available various surfaces that when metallized create an attractive visual impact. This visual quality renders it suitable for use in many commercial applications.

Thus, metallized films, are already widely used. However, the invention's added feature of breathability lends even greater utility to the metallized film. For instance, a metallized breathable polyolefin film provides a very effective, light weight blanket for camping. Such a film could also be used as an attractive outerskin, in combination with a thin insulating material, in, for example, ski outfits and other active outerwear in cold climates.

While metallized films are both useful and attractive, it is difficult to obtain good adhesion of a metal to a relatively non-polar substrate such as a polyolefin. High electrostatic treatment levels are necessary. Indeed, ten years ago industry experts generally believed that LDPE could not be metallized with good metal adhesion.

When the breathable film of the parent application was metallized, much better than expected adhesion was obtained. While not wishing to be bound by any theory, it is speculated that the better than expected adhesion may be due to the larger surface area exposed by the breathable pore spaces and/or the increased polarity of the breathable film caused by the fillers in its composition. Of course, the good metal adhesion and substantial retention of breathability properties may be due to some other phenomenon.

SUMMARY OF THE INVENTION

The present invention relates to a breathable metallized film produced by depositing a fine metallic layer on a breathable film. The product exhibits excellent metal adhesion properties, is flexible, has a pleasing shiny metallic appearance and substantially retains the breathable properties of the unmetallized film.

DETAILED DESCRIPTION OF PREFERRED EMBODIMENTS OF THE INVENTION

Film Forming Compositions

Breathable films which form the basis of the present invention are produced from a precursor film that is prepared from a polymer composition that comprises at least a polyolefin component and a filler. The polyolefin component may be any polyolefin which is suitable for film production, such as polypropylene, copolymers of propylene, homopolymers and copolymers of ethylene or blends thereof. A preferred polyolefin is a copolymer of polypropylene and low density polyethylene, particularly preferred is linear low density polyethylene.

Linear low density polyethylene (LLDPE) is produced by copolymerizing ethylene with a $C_4$ to $C_{10}$ alpha-olefin. Generally the preferred alpha-olefins include those selected from the group comprising butene-1, pentene-1, hexene-1, 4 methylpentene-1, heptene-1, and octene. The comonomers are present in amounts up to 20 wt. %, normally between 3 and 14 wt. %. The polymerization is conducted at low pressure using a chromium catalyst or Ziegler catalyst and may be carried out in the gas phase. The LLDPE produced by such methods have a density between 0.900 and 0.935 g/cm$^3$ and a melt index (MI) between 0.1 and 5.0 grams per 10 minutes. Manufacturing processes for production of LLDPE are known, such as disclosed in U.S. Pat. Nos. 4,076,698 and 4,205,021. LLDPE is preferred as the polyolefin component for use in this invention because of its high tear strength, ease of compounding, and low cost.

Fillers useful in this invention may be any inorganic or organic material having a low affinity for and a significantly lower elasticity than the polyolefin component. Preferably the filler should be a rigid material having a non-smooth hydrophobic surface, or a material which is treated to render its surface hydrophobic. The preferred mean average particle size of the filler is between about 3 to 5 microns for films having a thickness of between 4-6 mil prior to stretching. Examples of the inorganic fillers include calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, glass powder, zeolite, silica clay, etc. Calcium carbonate is particularly preferred for low cost, whiteness, inertness, and availability. The inorganic fillers such as calcium carbonate are preferably surface treated to be hydrophobic so that the filler can repel water to reduce agglomeration of the filler. Also, the surface coating should improve binding of the filler to the polymer while allowing the filler to be pulled away from the polyolefin under stress. A preferred coating is calcium stearate which is FDA approved and readily available. Organic fillers such as wood powder, pulp powder, and other cellulose type powders may be used. Polymer powders such as Teflon ® powder (polytetrafluoroethylene) and Kevlar ® powder can also be used.

The amount of filler added to the polyolefin depends on the desired properties of the breathable film including tear strength, water vapor transmission rate, and stretchability. However, it is believed that a breathable film cannot be produced as is taught herein with an amount of filler less than about 15 percent by volume of the polyolefin/filler composition (e.g. LLDPE/CaCO$_3$ having less than about 38 percent by weight CaCO$_3$). The minimum amount of filler is needed to insure the interconnection within the film of voids created at the situs of the filler particularly by the stretching operation to be subsequently performed on the precursor film. Further, it is believed that useful films could not be made with an amount of the filler in excess of about 35 percent by volume of the polyolefin/filler composition (e.g. LLDPE/CaCO$_3$ having greater than about 65 percent by weight CaCO$_3$). Higher amounts of filler may cause difficulty in compounding and significant losses in strength of the final breathable film.

Polyolefin/filler compositions usable in this invention may be compounded in several different ways. The components may be brought into intimate contact by, for example, dry blending these materials and then passing the overall composition through a compounding extruder. Alternatively, the polyolefin and filler components may be fed directly to a mixing device such as a compounding extruder, high shear continuous mixer, two roll mill or an internal mixer such as a Banbury mixer. Overall, the objective is to obtain a uniform dispersion of the filer in the polymer without agglomeration, and this is readily achieved by inducing sufficient shear and heat to cause the polyolefin component to melt. However, time and temperature of mixing should be controlled as is normally done to avoid molecular weight degradation. Compounding of LLDPE and calcium carbonate that is surface treated with calcium stearate has been improved by vacuum drying the mixture within the extruder.

The tear strength and softness of a film prepared from the polyolefin/filler composition may be improved by addition of small amounts of an olefinic elastomer.

Film Extrusion and Melt Embossing

The film forming composition may be manufactured into a precursor film by conventional tubular extrusion (blown bubble process) or by cast extrusion. Film formation by cast extrusion is preferred because the cast film can be immediately melt embossed as described below.

In the cast extrusion process, the molten resin is extruded from an elongate die in the form of a web. The web is pulled over at east one patterned embossing roller to chill and solidify the film with an embossed pattern for reasons discussed further below. The precursor film is preferably produced to a gauge of 4 to 6 mils, which allows for further stretching as described below. The extrusion temperatures, die temperatures, and embossing roll temperatures will depend on the composition employed, but generally will be in the following ranges for compositions of the present invention prepared by cast extrusion:
  Melt Temperature (°F.): 350–450
  Die Temperature (°F.): 350–450
  Embossing Roll Temperature (°F.): 70–130

Film formation by tubular extrusion produces balanced films having increased film strength in both the machine and cross-machine direction. In the tubular blown film process, the film forming composition is first meted and then extruded through an annular die. The die should preferably have a die gap suitable for extruding LLDPE resin which normally is greater than about 0.5 mm and preferably greater than 0.75 mm. The film forming composition is extruded at a melt temperature between about 150° C. to 300° C., preferably between 190° C. and 240° C. The molten composition is preferably extruded in an upward vertical direction in the form of either a bubble or a tube, although it also can be extruded either downwardly or horizontally. The tubular extrudate is expanded to the desired dimensions and then cooled by one of several conventional techniques which are well known in the art, e.g., forced air, mandrel, and water quench. The tubular film, or bubble, is then flattened by passing the film through a collapsing frame and a set of nip rolls. The nip rolls are driven, thereby proving a means of drawing the tubular film or bubble away from the annular die.

A positive pressure of a gas, such as air or nitrogen, is maintained inside the tubular bubble. As is known in the operation of conventional blown film processes, the presence of the gas is controlled to impart a desired dimensional orientation to the film tube or bubble. The degree of tubular bubble expansion may be measured as the ratio of the expanded bubble circumference to the circumference of the die annulus. This ratio is generally in the range of 1:1 to 6:1 and for a precursor breathable film is preferably from 2:1 to 4:1.

Embossing is typically used on the surface of polyolefin films to reduce gloss. Embossing can be imposed on the precursor film surface at the time of the film fabrication for cast extrusion, or at a subsequent time for cast or tubular extrusion by procedures well known in the art. For the present invention, embossing imposes a pattern of different film thicknesses within the precursor film, and can be conducted with any micro/macro pattern, e.g. cross-hatching, dots, lines, circles, diamonds, hexagons etc. The pattern can be either in line and/or off line and the rolls can be engraved with either pin up and/or pin down type configurations.

Stretching and Heat Setting

Final preparation of a breathable film is achieved by stretching the precursor film to form interconnected voids. Stretching or "orientation" of the film may be carried out monoaxially in the machine direction (MD) or the transverse direction (TD) or in both directions (biaxially) either simultaneously or sequentially using conventional equipment and processes following cooling of the precursor film.

Blown films are preferably stretched in the machine direction or in both directions whereas cast films are preferably stretched in the transverse direction. For orientation in the MD, the precursor film is passed around two rollers driven at different surface speeds and finally to a take up roller. The second driven roller which is closest to the take up roll is driven faster than the first driven roller. As a Consequence the film is stretched between the driven rollers.

Film orientation may also be carried out in a tentering device with or without MD orientation to impart TD orientation to the film. The film is gripped by the edges for processing through the tentering device.

Stretching of melt embossed precursor films with a tentering device at a film speed of about 60 meters per minute produced breathable films having the desired water vapor permeability. The resulting films had greater permeability in the areas of reduced thickness in comparison to the areas of greater thickness.

Although not thoroughly investigated, controlling of the strain on the film during stretching is believed to be important to controlling the permeability. For stretching in the transverse direction, strain is controlled for a given stretch ratio by adjusting the film speed and the stretching distance. The stretching distance is measured, between the point where the film starts to increase in width to the closest point where the fully stretched. For stretching in the machine directly, strain is controlled for a given stretch ratio by controlling film speed and the gap between the first and second driven rollers.

A range of stretching ratios from 1:2 to 1:5 prove satisfactory for MD stretching with a ratio of 1:4 being preferred. A range of stretching ratios of 1:2 to 1:5 prove satisfactory for TD stretching with a ratio of 1:4 being preferred.

The water vapor permeability of the embossed film following stretching, as measured by the final WVTR of the film, was found to be inversely related to the stretching temperature. Stretching at a temperature of about 45° C. produced a film having a slightly higher WVTR than stretching at temperatures of about 60° C.

The stretched film can be head set to stabilize the film for any subsequent processing at temperatures above the stretching temperature. The film can be heat set at any temperature above the stretching temperature and below the softening temperature to add stability. However, higher temperatures cause stiffness and some reduction in WVTR. Heat setting at about 80° C. produced a softer film with substantially higher WVTR in comparison to heat setting at about 95° C.

It is preferred that tension be maintained on the film during the heat setting and Cooling to minimize shrinkback. Upon cooling to ambient temperature (i.e., room temperature) or near ambient, the holding force may be released. The film may contract somewhat (snapback) in the TD but will retain a substantial portion of its stretched dimension.

Heat setting can be accomplished by maintaining the film under tension in the stretched condition at the heat setting temperature for about 1-2 minutes. Preferably, however, the heat setting and cooling is carried out while permitting the film to contract slightly, but still under stress. The controlled shrinkback of from 5 to 30%, preferably between 15 and 25%, of the maximum stretched width has given particularly good results in eliminating storage shrinkage.

Metallic Film Deposition

In the preferred metallizing process rolls of breathable film are placed in a chamber which is evacuated to a very low pressure. The metal (usually aluminum) is then heated to about 1400° C. at which point metal vapors rise and impinge upon the surface of the film being wound through the vapor.

The very low pressure of $10^{-4}$ to $10^{-5}$ Torr (1 Torr = 1 mm Hg) is necessary to give a sufficiently long molecular mean free path such that the metal molecules strike the film with sufficient force to adhere. The temperature of about 1400° C. is varied slightly to control the metallic vapor pressure and thus the rate of metal deposition. While the total cycle time is affected by web speed, cycletime is more a function of pumping time to reach the rarefied pressures necessary for metallization.

Aluminum is the most commonly used metal because it is effective, low in cost, and has a low met point. Other metals such as gold will also provide a reflective surface but at higher cost. A metal may be selected for a specific property such as environmental resistance, electrical conductivity or other desirable property.

Metal thickness is measured both optically and electrically. Thickness can be expressed optically as the percentage of light transmitted through a metallized film, or it can be expressed electrically as resistance in ohms per square. Typical coatings measure 3 to 4 ohms per square with heavy coatings measuring less than 1 ohm per square. An experienced metallizer operator can control metal deposition very closely by visually estimating the light transmittance through the film as it passes over a fluorescent tube in the chamber. The uniformity of the coating can also be visually monitored in addition to other control parameters such as source temperature and web speed. As an alternative to the operator visually monitoring light transmittance, the metallizing industry uses an instrument that measures optical density (O.D.) which correlates inversely with light transmission. For insulation, an O.D. of about 3.0 is desirable and as the O.D. decreases below about 2.0 these insulating properties decrease.

Excellent metal adhesion is important for proper performance of a metallized film, especially in a laminate. Metal adhesion is tested in the industry by using a particular type of stick cellophane tape. The tape is applied to the metal surface and then removed. The tape is then examined for signs of metal pick-off. A reading of 50% adhesion corresponds to half the tape area being covered. 100% adhesion indicates no metal was removed. Commercially metallized polyethylene has 100% metal adhesion.

The metallizing process described is the preferred method but variations on this basic process may be used to good effect. For the deposition of alloys, electron beam methods known in the art, are used because the differing vapor pressures of the components in an alloy render the above described heated pot method inappropriate.

EXAMPLE 1

A metallized film was produced through the following steps.

1) A polyolefin, LLDPE, was compounded with calcium carbonate as a filler in a 50-50 blend ratio by weight. Polyisobutylene, with a medium high molecular weight in excess of 1 million, was dispersed into the previously compounded mixture.

2) The formulation described in step 1 was then cast extruded to form a film of 4-6 mil in thickness.

3) This film was subjected to tenter stress with a cross-machine direction stretch ratio of 4:1. The film became whiter and more breathable when stretched at 43° C. followed by heat setting treatment between 65-95° C.

4) This breathable film was metallized with aluminum metal under high vacuum and resulted in a metallized structure having WVTR of approximately 6900 grams per square meter per day at 38° C. and a Gurley value of approximately 800 seconds.

TABLE I

| Unmetallized | | Metallized | |
|---|---|---|---|
| Gurley | WVTR | Gurley | WVTR |
| 600 | 8000 | 786 | 6938 |

The invention has been with reference to its preferred embodiments. Those of ordinary skill in the art may appreciate, from the description, changes and modifications which may be made to the invention and which do not depart from the scope and spirit of the invention as described above or claimed hereafter.

We claim:

1. A metallized breathable film produced by a process comprising the steps of:

mixing a polyolefin with a filler to form a polyolefin/filler mixture containing between about 15 percent to about 35 percent filler by volume;

extruding a precursor film from the polyolefin/filler mixture;

melt embossing the precursor film to impose therein a pattern of different film thicknesses;

stretching the melt embossed precursor film to impart greater permeability in the areas of reduced thickness thereof in comparison to the areas of greater thickness; and coating the stretched film with a metal.

2. The breathable film of claim 1, further produced by the step of heat setting the stretched film at a temperature above the stretching temperature and below the softening temperature of the stretched film.

3. The metallized breathable film of claim 1, wherein the polyolefin is a copolymer of ethylene and a $C_4$–$C_{10}$ alpha-olefin.

4. The metallized breathable film of claim 1, wherein the filler is calcium carbonate surface treated with calcium stearate.

5. The metallized breathable film of claim 1, wherein the precursor film is melt embossed with a diamond pattern.

6. The metallized breathable film of claim 1, wherein said metal is aluminum.

7. The breathable film of claim 1, wherein the filler is a material selected from the group consisting of calcium carbonate; talc; clay; kaolin; silica; diatomaceous earth; magnesium carbonate; barium carbonate; magnesium sulfate; barium sulfate; calcium sulfate; aluminum hydroxide; zinc oxide; magnesium hydroxide; calcium oxide; magnesium oxide; titanium oxide; alumina; mica; glass powder; zeolite; silica clay; wood powder; pulp powder; cellulose powder; polytetrafluoroethylene powder; and aromatic polyamide powder.

8. A metallized breathable film, comprising:
a polyolefin and a filler in a polyolefin/filler mixture containing between about 15 percent to about 35 percent filler by volume;
a pattern of different film thicknesses having greater permeability in the areas of reduced thickness thereof in comparison to the areas of greater thickness; and
a coating of a metal.

9. The metallized breathable film of claim 8, wherein the polyolefin is a copolymer of ethylene and a $C_4$–$C_{10}$ alpha-olefin.

10. The metallized breathable film of claim 8, wherein the filler is calcium carbonate surface treated with calcium separate.

11. The metallized breathable film of claim 8, wherein the pattern of different film thicknesses is a diamond pattern.

12. The metallized breathable film of claim 8, wherein said metal is aluminum.

13. The metalized breathable film of claim 8, wherein the filler is a material selected from the group consisting of calcium carbonate; talc; clay; kaolin; silica; diatomaceous earth; magnesium carbonate; barium carbonate; magnesium sulfate; barium sulfate; calcium sulfate; aluminum hydroxide; zinc oxide; magnesium hydroxide; calcium oxide; magnesium oxide; titanium oxide; alumina; mica; glass powder; zeolite; silica clay; wood powder; pulp powder; cellulose powder; polytetrafluoroethylene powder; and aromatic polyamide powder.

14. A metallized breathable film by a process comprising the steps of:
mixing a polyolefin with a filler to form a polyolefin/filler mixture containing between about 15 percent to about 35 percent filler by volume;
cast extruding a precursor film of the polyolefin/filler mixture onto at least one melt embossing roller to impose therein a pattern of different film thicknesses;
stretching the melt embossed precursor film in the transverse direction to impart greater permeability in the areas of reduced thickness thereof in comparison to the areas of greater thickness; and
coating the stretched film with a metal.

15. The breathable film of claim 14, further produced by the step of heat setting the stretched film at a temperature above the stretching temperature and below the softening temperature of the stretched film.

16. The breathable film of claim 28, wherein the polyolefin is a copolymer of ethylene and a $C_4$–$C_{10}$ alpha-olefin.

17. The breathable film of claim 14, wherein the filler is calcium carbonate surface treated with calcium stearate.

18. The breathable film of claim 14, wherein the precursor film is melt embossed with a diamond pattern.

19. The breathable film of claim 14, wherein the metal is aluminum.

20. The breathable film of claim 14, wherein the filler is a material selected from the group consisting of calcium carbonate; talc; clay; kaolin; silica; diatomaceous earth; magnesium carbonate; barium carbonate; magnesium sulfate; barium sulfate; calcium sulfate; aluminum hydroxide; zinc oxide; magnesium hydroxide; calcium oxide; magnesium oxide; titanium oxide; alumina; mica; glass powder; zeolite; silica clay; wood powder; pulp powder; cellulose powder; polytetrafluoroethylene powder; and aromatic polyamide powder;

21. A method of making a metallized breathable film, comprising the steps of:
mixing a polyolefin with a filler to form a polyolefin/filler mixture containing between about 15 percent to about 35 percent filler by volume;
extruding a precursor film from the polyolefin/filler mixture;
melt embossing the precursor film to impose therein a pattern of different film thicknesses;
stretching the melt embossed precursor film to impart greater permeability in the areas of reduced thickness thereof in comparison to the areas of greater thickness; and
coating the stretched film with a metal.

22. The method of claim 21, further comprising the step of heat setting the stretched film at a temperature above the stretching temperature and below the softening temperature of the stretched film.

23. The method of claim 21, wherein the polyolefin is a copolymer of ethylene and a $C_4$–$C_{10}$ alpha-olefin.

24. The method of claim 21, wherein the filler is calcium carbonate surface treated with calcium stearate.

25. The method of claim 21, wherein the precursor film is melt embossed with a diamond pattern.

26. The method of claim 21 wherein said metal is aluminum.

27. A method according to claim 21 wherein the filler is a material selected from the group consisting of calcium carbonate; talc; clay; kaolin; silica; diatomaceous earth; magnesium carbonate; barium carbonate; magnesium sulfate; barium sulfate; calcium sulfate; aluminum hydroxide; zinc oxide; magnesium hydroxide; calcium oxide; magnesium oxide; titanium oxide; alumina; mica; glass powder; zeolite; silica clay; wood powder; pulp powder; callulose powder; polytetrafluoroethylene powder; and aromatic polyamide powder.

28. A method of making a metallized breathable film, comprising the steps of:
mixing a polyolefin with a filler to form a polyolefin/filler containing between about 15 percent to about 35 percent filler by volume;
cast extruding a precursor film of the polyolefin/filler mixture onto at least one melt embossing roller to impose therein a pattern of different film thicknesses;

stretching the melt embossed precursor film in the transverse direction to impact greater permeability in the areas of reduced thickness thereof in comparison to the areas of greater thickness; and
coating the stretched film with a metal.

29. The method of claim 28, further comprising the step of heat setting the stretched film at a temperature above the stretching temperature and below the softening temperature of the stretched film.

30. The method of claim 28, wherein the polyolefin is a copolymer of ethylene and a $C_4$–$C_{10}$ alpha-olefin.

31. The method of claim 28, wherein the filler is calcium carbonate surface treated with calcium stearate.

32. The method of claim 28, wherein the precursor film is melt embossed with a diamond pattern.

33. The method of claim 28 wherein said metal is aluminum.

34. The method of claim 28 wherein the filler is a material selected from the group consisting of calcium carbonate; talc; clay; kaolin; silica; diatomaceous earth; magnesium carbonate; barium carbonate; magnesium sulfate; barium sulfate; calcium sulfate; aluminum hydroxide; zinc oxide; magnesium hydroxide; calcium oxide; magnesium oxide; titanium oxide; alumina; mica; glass powder; zeolite; silica clay; wood powder; pulp powder; cellulose powder; polytetrafluoroethylene powder; and aromatic polyamide powder.

* * * * *